United States Patent
Kawasaki et al.

(10) Patent No.: US 12,534,651 B2
(45) Date of Patent: Jan. 27, 2026

(54) ELECTRICALLY CONDUCTIVE ADHESIVE, SINTERED BODY OF ELECTRICALLY CONDUCTIVE ADHESIVE, METHOD FOR PRODUCING SINTERED BODY, ELECTRONIC COMPONENT, AND METHOD FOR PRODUCING ELECTRONIC COMPONENT

(71) Applicants: THE SCHOOL CORPORATION KANSAI UNIVERSITY, Suita (JP); OSAKA SODA CO., LTD., Osaka (JP)

(72) Inventors: Hideya Kawasaki, Suita (JP); Suguru Hashidate, Osaka (JP); Ryo Katou, Osaka (JP); Takamichi Mori, Osaka (JP); Junichiro Minami, Osaka (JP)

(73) Assignees: The School Corporation Kansai University, Suita (JP); Osaka Soda Co., Ltd., Osaka (JP)

( * ) Notice: Subject to any disclaimer, the term of this patent is extended or adjusted under 35 U.S.C. 154(b) by 236 days.

(21) Appl. No.: 18/546,658

(22) PCT Filed: Feb. 14, 2022

(86) PCT No.: PCT/JP2022/005713
§ 371 (c)(1),
(2) Date: Aug. 16, 2023

(87) PCT Pub. No.: WO2022/176809
PCT Pub. Date: Aug. 25, 2022

(65) Prior Publication Data
US 2024/0052213 A1 Feb. 15, 2024

(30) Foreign Application Priority Data
Feb. 18, 2021 (JP) .................. 2021-024327

(51) Int. Cl.
*C09J 9/02* (2006.01)
*C09J 11/04* (2006.01)
*C09J 163/00* (2006.01)

(52) U.S. Cl.
CPC ................. *C09J 9/02* (2013.01); *C09J 11/04* (2013.01); *C09J 163/00* (2013.01); *C09J 2301/50* (2020.08)

(58) Field of Classification Search
CPC . C09J 9/02; C09J 11/04; C09J 163/00; C08K 2003/0806; C08K 2201/001; H01B 1/22
See application file for complete search history.

(56) References Cited

U.S. PATENT DOCUMENTS

2017/0210951 A1* 7/2017 Abe ...................... C09J 121/00
2022/0288678 A1 9/2022 Okuda et al.
2022/0288681 A1 9/2022 Nitanai et al.

FOREIGN PATENT DOCUMENTS

JP 2012-022795 A 2/2012
JP 2015-159096 A 9/2015
(Continued)

OTHER PUBLICATIONS

International Search Report received in International Application No. PCT/JP2022/005713, mailed on Apr. 26, 2022.

*Primary Examiner* — Daniel Mcnally
(74) *Attorney, Agent, or Firm* — Knobbe, Martens, Olson & Bear, LLP

(57) ABSTRACT

Provided is a novel electrically conductive adhesive which can yield a sintered body having low resistivity despite containing a thermosetting resin in addition to silver particles. This electrically conductive adhesive contains silver particles and a thermosetting resin. The silver particles are provided with a protective layer that contains a compound represented by general formula (1).

(Continued)

[In general formula (1), $R^1$ is an alkyl group having 1-5 carbon atoms, and $R^2$ is a hydrogen atom or an alkyl group having 1-5 carbon atoms.]

9 Claims, 1 Drawing Sheet

(56) References Cited

FOREIGN PATENT DOCUMENTS

| WO | WO 2016/204105 A1 | 12/2016 | |
|---|---|---|---|
| WO | WO-2017169534 A1 * | 10/2017 | .............. B22F 1/102 |
| WO | WO 2021/039361 A1 | 3/2021 | |
| WO | WO 2021/044817 A1 | 3/2021 | |

* cited by examiner

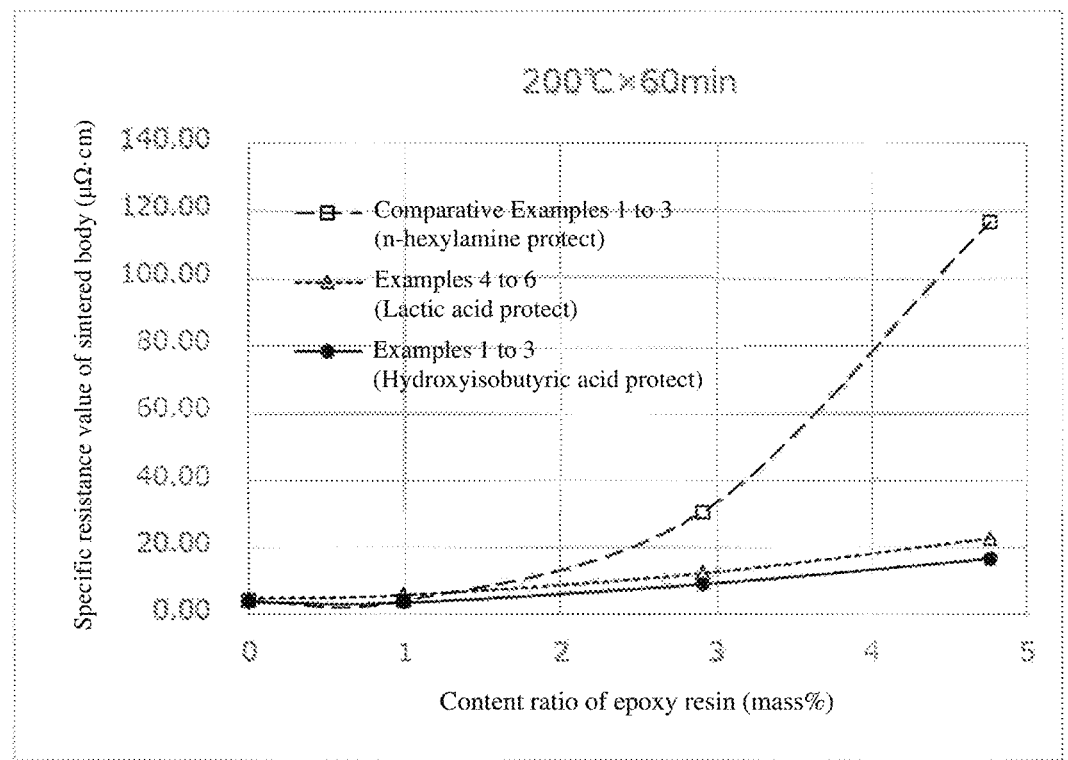

ELECTRICALLY CONDUCTIVE ADHESIVE, SINTERED BODY OF ELECTRICALLY CONDUCTIVE ADHESIVE, METHOD FOR PRODUCING SINTERED BODY, ELECTRONIC COMPONENT, AND METHOD FOR PRODUCING ELECTRONIC COMPONENT

TECHNICAL FIELD

The present invention relates to an electrically conductive adhesive, a sintered body of the electrically conductive adhesive, a method for manufacturing a sintered body, an electronic component, and a method for manufacturing an electronic component.

BACKGROUND ART

An electrically conductive adhesive such as a die bonding agent is a bonding material used for electronic components such as semiconductors, LEDs, and power semiconductors. As the bonding method, it is generally known to bond a substrate through pressurization and heating or through sintering by heating or the like without pressurization. In recent years, from the viewpoint of simplicity and efficiency of the manufacturing process, bonding materials for the non-pressurizing system have been being developed.

In recent years, electrically conductive adhesives utilizing a silver particle have been being developed. A silver particle is characterized by being easily sintered through a heat treatment at a low temperature for a short time. For example, Patent Document 1 discloses a metal paste obtained by kneading: a solid content composed of a silver particle; and a solvent, wherein the solid content is composed of a silver particle containing a silver particle having a particle size of 100 to 200 nm in an amount of 30% or more on the basis of the number of particles and, in addition, the silver particle constituting the solid content is bonded with an amine compound having 4 to 8 carbon atoms in total as a protective agent. The metal paste is considered to make it possible to sinter the silver particle in a low temperature range and, in addition to this, to form a sintered body with low resistance and excellent thermal conductivity.

PRIOR ART DOCUMENT

Patent Document

Patent Document 1: Japanese Patent Laid-open Publication No. 2015-159096

SUMMARY OF THE INVENTION

Problems to be Solved by the Invention

In the field of electrically conductive adhesives, a sintered body obtained by applying onto a member (for example, a substrate, a semiconductor chip, or the like used for an electronic component) and sintering an electrically conductive adhesive is required to have a lower specific resistance value. However, the sintered body of an electrically conductive adhesive containing a thermosetting resin in addition to a silver particle has a problem that the specific resistance value tends to increase due to the presence of the thermosetting resin.

Under such circumstances, it is a primary object of the present invention to provide a novel electrically conductive adhesive that contains a thermosetting resin in addition to a silver particle but can yield a sintered body having a low specific resistance value. Further, it is also an object of the present invention to provide a sintered body of the electrically conductive adhesive, a method for manufacturing a sintered body, an electronic component, and a method for manufacturing an electronic component.

Means for Solving the Problem

The present inventors have conducted intensive studies in order to solve the above problems. As a result, the present inventors have found that, in an electrically conductive adhesive containing a silver particle and a thermosetting resin, a sintered body having a low specific resistance value can be obtained by forming a protective layer containing a specific compound on the silver particle. The present invention has been completed by further conducting studies based on such findings.

That is, the present invention provides inventions of the following aspects.

Item 1. An electrically conductive adhesive including:
a silver particle; and
a thermosetting resin,
wherein the silver particle has a protective layer containing a compound represented by the following general formula (1):

[Chemical Formula 1]

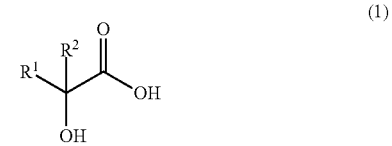

wherein $R^1$ represents an alkyl group having 1 to 5 carbon atoms; and $R^2$ represents a hydrogen atom or an alkyl group having 1 to 5 carbon atoms.

Item 2. The electrically conductive adhesive according to Item 1, wherein the thermosetting resin is an epoxy resin.

Item 3. The electrically conductive adhesive according to Item 1 or 2, wherein the silver particle is contained in a content ratio of 70 mass % or more.

Item 4. The electrically conductive adhesive according to any one of Items 1 to 3, further including a solvent.

Item 5. The electrically conductive adhesive according to Item 4, wherein the solvent has an octanol/water partition coefficient (Log Pow) of −2 or more and 4 or less.

Item 6. A sintered body of the electrically conductive adhesive according to any one of Items 1 to 5.

Item 7. An electronic component in which members are bonded with each other by the sintered body according to Item 6.

Item 8. A method for manufacturing a sintered body, the method including: a step of sintering the electrically conductive adhesive according to any one of Items 1 to at a temperature of 100° C. or more and 250° C. or less.

Item 9. A method for manufacturing an electronic component in which members are bonded with each other by a sintered body, the method including:
a step of disposing the electrically conductive adhesive according to any one of Items 1 to 5 between the members; and a step of sintering the electrically conductive adhesive at a temperature of 100° C. or more and 250° C. or less.

Advantages of the Invention

The present invention can provide a novel electrically conductive adhesive that contains a thermosetting resin in addition to a silver particle but can yield a sintered body having a low specific resistance value. Further, the present invention can provide a sintered body of the electrically conductive adhesive, a method for manufacturing a sintered body, an electronic component, and a method for manufacturing an electronic component.

BRIEF DESCRIPTION OF THE DRAWINGS

FIG. 1 is a graph showing the relationship between the content ratio (mass %) of the epoxy resin in the sintered body of the electrically conductive adhesive and the specific resistance value (μΩ·cm) of the sintered body in Examples 1 to 6 and Comparative Examples 1 to 3.

EMBODIMENTS OF THE INVENTION

An electrically conductive adhesive of the present invention is characterized by: an electrically conductive adhesive including a silver particle and a thermosetting resin, wherein the silver particle has a protective layer containing a compound represented by the following general formula (1). The electrically conductive adhesive of the present invention, having such a configuration, contains a thermosetting resin in addition to a silver particle but can yield a sintered body having a low specific resistance value.

[Chemical Formula 2]

(1)

In the general formula (1), $R^1$ represents an alkyl group having 1 to 5 carbon atoms; and $R^2$ represents a hydrogen atom or an alkyl group having 1 to 5 carbon atoms.

Hereinafter, the electrically conductive adhesive of the present invention, sintered body of the electrically conductive adhesive, method for manufacturing a sintered body, electronic component, and method for manufacturing an electronic component are detailed. Note that, in the present specification, numerical values joined by "to" mean a numerical range including numerical values before and after "to" as a lower limit value and an upper limit value. When a plurality of lower limit values and a plurality of upper limit values are described separately, an arbitrary lower limit value and upper limit value can be selected to be joined by "to".

1. Electrically Conductive Adhesive

The electrically conductive adhesive of the present invention contains a silver particle and a thermosetting resin.

The silver particle has a protective layer. Specifically, the silver particle has a protective layer on the surface of a particle composed of silver. The protective layer contains a compound represented by the general formula (1). The electrically conductive adhesive of the present invention, containing the compound represented by the general formula (1) in the protective layer, is excellent in dispersibility of the silver particle into a solvent and can yield a sintered body having a low specific resistance value.

As described above, in the general formula (1), $R^1$ is an alkyl group having 1 to 5 carbon atoms. From the viewpoint of more suitably exhibiting the effect of the present invention, $R^1$ is preferably an alkyl group having 1 to 3 carbon atoms, and more preferably an alkyl group having one carbon atom (that is, a methyl group). $R^2$ is a hydrogen atom or an alkyl group having 1 to 5 carbon atoms. From the viewpoint of more suitably exhibiting the effect of the present invention, $R^2$ is preferably a hydrogen atom or an alkyl group having 1 to 3 carbon atoms, more preferably a hydrogen atom or an alkyl group having one carbon atom (that is, a methyl group), and particularly preferably an alkyl group having one carbon atom (that is, a methyl group). That is, among the compounds represented by the general formula (1), 2-hydroxyisobutyric acid and lactic acid (L-form, D-form, and DL-form) are particularly preferable, and 2-hydroxyisobutyric acid is most preferable. The compound represented by the general formula (1) contained in the protective layer may be one kind or two or more kinds.

In addition, the protective layer may contain a compound different from the compound represented by the general formula (1). Examples of the different compound include amine compounds, fatty acids, and hydroxy fatty acids (a hydroxy fatty acid different from the compound represented by the general formula (1)). When the compound different from the compound represented by the general formula (1) is contained in the protective layer, the different compound contained in the protective layer may be one kind or two or more kinds.

The amine compound is not particularly limited, and an alkylamine is preferable from the viewpoint of more suitably exhibiting the effect of the present invention. The alkylamine is not particularly limited, and examples thereof include preferably an alkylamine having an alkyl group having 3 or more and 18 or less carbon atoms, and more preferably an alkylamine having an alkyl group having 4 or more and 12 or less carbon atoms.

Preferred specific examples of the alkylamine include ethylamine, n-propylamine, isopropylamine, 1,2-dimethylpropylamine, n-butylamine, isobutylamine, sec-butylamine, tert-butylamine, isoamylamine, tert-amylamine, 3-pentylamine, n-amylamine, n-hexylamine, n-heptylamine, n-octylamine, 2-octylamine, 2-ethylhexylamine, n-nonylamine, n-aminodecane, n-aminoundecane, n-dodecylamine, n-tridecylamine, 2-tridecylamine, n-tetradecylamine, n-pentadecylamine, n-hexadecylamine, n-heptadecylamine, n-octadecylamine, n-oleylamine, N-ethyl-1,3-diaminopropane, N,N-diisopropylethylamine, N,N-dimethylaminopropane, N,N-dibutylaminopropane, N,N-dimethyl-1,3-diaminopropane, N,N-diethyl-1,3-diaminopropane, N,N-diisobutyl-1,3-diaminopropane, N-lauryldiaminopropane, and the like. Further, dibutylamine, which is a secondary amine; and cyclopropylamine, cyclobutylamine, cyclopropylamine, cyclohexylamine, cycloheptylamine, cyclooctylamine, and the like, which are cyclic alkylamines, can also be exemplified. Among them, from the viewpoint of more suitably exhibiting the effect of the present invention, n-propylamine, isopropylamine, cyclopropylamine, n-butylamine, isobutylamine, sec-butylamine, tert-butylamine, cyclobutylamine, n-amylamine, n-hexylamine, cyclohexylamine, n-octylamine, 2-ethylhexylamine, n-dodecylamine, n-oleylamine, N,N-dimethyl-1,3-diaminopropane, and N,N-diethyl-1,3-diaminopropane are preferable, and n-butylamine, n-hexylamine, cyclohexylamine, n-octylamine, n-dodecylamine, N,N-dimethyl-1,3-diaminopropane, and N,N-diethyl-1,3-diaminopropane are more preferable. The amine compound may be used singly or in combination of two or more kinds thereof.

The fatty acid is not particularly limited, and examples thereof include preferably fatty acids whose alkyl group has 3 or more and 18 or less carbon atoms, and more preferably fatty acids whose alkyl group has 4 or more and 18 or less carbon atoms. Preferred specific examples of the fatty acid include acetic acid, propionic acid, butyric acid, valeric acid, caproic acid, caprylic acid, 2-ethylhexanoic acid, capric acid, lauric acid, myristic acid, palmitic acid, stearic acid, oleic acid, linoleic acid, and α-linolenic acid. Specific examples of the fatty acid also include cyclic alkyl carboxylic acids, such as cyclohexanecarboxylic acid. As the hydroxy fatty acid, a compound having 3 to 24 carbon atoms and having one or more (for example, one) hydroxyl groups can be used. Examples of the hydroxy fatty acid different from the compound represented by the general formula (1) include 2-hydroxydecanoic acid, 2-hydroxydodecanoic acid, 2-hydroxytetradecanoic acid, 2-hydroxyhexadecanoic acid, 2-hydroxyoctadecanoic acid, 2-hydroxyeicosanoic acid, 2-hydroxydocosanoic acid, 2-hydroxytricosanoic acid, 2-hydroxytetracosanoic acid, 3-hydroxyhexanoic acid, 3-hydroxyoctanoic acid, 3-hydroxynonanoic acid, 3-hydroxydecanoic acid, 3-hydroxyundecanoic acid, 3-hydroxydodecanoic acid, 3-hydroxytridecanoic acid, 3-hydroxytetradecanoic acid, 3-hydroxyhexadecanoic acid, 3-hydroxyheptadecanoic acid, 3-hydroxyoctadecanoic acid, co-hydroxy-2-decenoic acid, co-hydroxypentadecanoic acid, co-hydroxyheptadecanoic acid, co-hydroxyeicosanoic acid, co-hydroxydocosanoic acid, 6-hydroxyoctadecanoic acid, ricinoleic acid, 12-hydroxystearic acid, and [R-(E)]-12-hydroxy-9-octadecenoic acid. Among them, a hydroxy fatty acid having 4 to 18 carbon atoms and having one hydroxyl group at a position other than the ω position (particularly, at the 12 position) is preferable, and ricinoleic acid and 12-hydroxystearic acid are more preferable. Each of the fatty acid and the hydroxy fatty acid may be used alone, or may be used in combination of two or more thereof.

In the silver particle of the present invention, the content ratio of silver contained in the silver particle is not particularly limited as long as the effect of the present invention is exhibited, and is preferably 95 mass % or more, and more preferably 98 mass % or more with respect to 100 mass % of the silver particle. In addition, the content ratio of the protective layer of the silver particle is not particularly limited as long as the effect of the present invention is exhibited, and is preferably 1.5 mass % or less, more preferably 1.3 mass % or less with respect to 100 mass % of the silver particle, and the lower limit is preferably 0.05 mass % or more. The content ratio of the protective layer of the silver particle can be measured by differential thermal analysis or thermogravimetric differential thermal analysis.

In the present invention, the proportion of the compound represented by the general formula (1) in the protective layer that the silver particle has is preferably 80 mass % or more, more preferably 90 mass % or more, still more preferably 95 mass % or more, and particularly preferably 99 mass % or more, and may be 100 mass %. As described later, as the protective layer of the silver particle, preferably employed is the method of depositing an amine compound or the like on the surface of a silver particle, followed by substituting the amine compound with the compound represented by the general formula (1). Therefore, the protective layer may contain an unsubstituted, remaining amine compound.

The average particle diameter of the silver particle is not particularly limited as long as the effect of the present invention is exhibited, and is, for example, 20 nm or more, preferably 30 nm or more, and more preferably 60 nm or more, and is, for example, 500 nm or less, preferably 400 nm or less, and more preferably 250 nm or less. Preferable ranges of the average particle diameter include 20 to 500 nm, 20 to 400 nm, 20 to 250 nm, 30 to 500 nm, 30 to 400 nm, 30 to 250 nm, 60 to 500 nm, 60 to 400 nm, and 60 to 250 nm.

In the present invention, the average particle diameter of the silver particle is a volume-based average particle diameter measured for 200 particles randomly selected in an SEM image, using an image analysis software (for example, Macview (manufactured by Mountech Co., Ltd.)). For the observation, a range with a lateral width of 1 to 20 μm is observed at an observation magnification of 5000 to 30000 times at an acceleration voltage of 20 kV using a SED mode (secondary electron detector). The longitudinal direction of the SEM image is set to be such a width that 200 or more (usually, about 200 to 300) silver particles are contained in the range of a horizontal width of 1 to 20 μm. In addition, the volume-based average particle diameter is a value measured on the assumption that a particle observed in the SEM image is a sphere having the diameter.

In the electrically conductive adhesive of the present invention, the content ratio of the silver particle is not particularly limited as long as the effect of the present invention is exhibited, and is, for example, 70 mass % or more, preferably 75 mass % or more, and more preferably 80 mass % or more, and is, for example, 95 mass % or less, preferably 93 mass % or less, and more preferably 90 mass % or less. Preferable ranges include 70 to 95 mass %, 70 to 93 mass %, 70 to 90 mass %, 75 to 95 mass %, 75 to 93 mass %, 75 to 90 mass %, 80 to 95 mass %, 80 to 93 mass %, and 80 to 90 mass %.

The electrically conductive adhesive of the present invention may contain a silver particle different from the silver particle having the protective layer containing the compound represented by the general formula (1). The content ratio of the silver particle having the protective layer containing the compound represented by the general formula (1) is preferably 80 mass % or more, more preferably 90 mass % or more, still more preferably 95 mass % or more, still more preferably 98 mass % or more, still more preferably 99 mass % or more, and still more preferably 100 mass % with respect to 100 mass % of the proportion for all the silver particles.

In the electrically conductive adhesive of the present invention, as the silver particle, a silver particle having a single average particle diameter (for example, in the range of 20 to 500 nm) may be used alone, or a plurality of silver particles having different average particle diameters (for example, in the range of 20 to 500 nm) may be used in combination. When a plurality of silver particles having different average particle diameters are used in combination, the ratio may be appropriately adjusted so as to obtain desired physical properties. For example, when silver particle A1 having a small average particle diameter and silver particle A2 having a large average particle diameter are used in a range of an average particle diameter of 20 to 500 nm, the ratio of silver particle A1:silver particle A2 may be in a range of 1 to 30:70 to 99. A silver particle having containing the compound represented by the general formula (1) and having an average particle diameter within a range of 20 to 500 nm may be referred to as silver particle "A".

The electrically conductive adhesive of the present invention may contain, as a silver particle, a silver particle having a larger average particle diameter (for example, in the range of 0.5 to 5.5 μm) in addition to silver particle "A" having an average particle diameter of 20 to 500 nm described above. A silver particle having an average particle diameter within a range of 0.5 to 5.5 μm may be referred to as silver particle "B". The protective layer of the silver particle may contain the compound represented by the general formula (1), or may contain a compound different from the compound represented by the general formula (1) (Specific examples are as described above.). For the average particle diameter of the silver particle "B", from the viewpoint of more suitably exhibiting the effect of the present invention, the lower limit thereof is preferably 0.6 μm or more, and the upper limit thereof is preferably 3.0 μm or less, more preferably 2.5 μm or less, still more preferably 2.0 μm or less, and the preferred range thereof is 0.5 to 3.0 μm, 0.5 to 2.5 μm, 0.5 to 2.0 μm, 0.6 to 3.0 μm, 0.6 to 2.5 μm, and 0.6 to 2.0 μm.

In the present invention, the average particle diameter of silver particle "B" can be measured by laser diffraction.

As silver particle "B" in the present invention, commercially available silver particles may be used, or silver particles synthesized by a known synthesis method may be used.

In the electrically conductive adhesive of the present invention, as the silver particle, silver particle "A" may be used alone or silver particle "A" and silver particle "B" may be used in combination. When silver particle "A" and silver particle "B" are used in combination, the mass ratio of silver particle "A" to silver particle "B" (silver particle "A":silver particle "B") 30 to 70:70 to 30, and is preferably in the range of 35 to 65:65 to 35, more preferably in the range of 40 to 60:60 to 40. When silver particle "A" and silver particle "B" are used in combination at a ratio in the above range, a higher shear strength can be obtained.

The thermosetting resin is not particularly limited as long as the effect of the present invention is not impaired, and examples thereof include epoxy resins, acrylic resins, silicone resins, urethane resins, vinyl ester resins, phenol resins, urea resins, melamine resins, unsaturated polyester resins, diallyl phthalate resins and polyimide resins. Among them, epoxy resins are particularly preferable. The thermosetting resin contained in the electrically conductive adhesive of the present invention may be one kind or two or more kinds.

In the electrically conductive adhesive of the present invention, the content ratio of the thermosetting resin is not particularly limited as long as the effect of the present invention is exhibited, and is, for example, 0.001 mass % or more, preferably 0.005 mass % or more, and more preferably 0.01 mass % or more, and is, for example, 10 mass % or less, preferably 7 mass % or less, and more preferably 3 mass % or less. Examples of the preferred range include 0.001 to 10 mass %, 0.001 to 7 mass %, 0.001 to 3 mass %, 0.005 to 10 mass %, 0.005 to 7 mass %, 0.005 to 3 mass %, 0.01 to 10 mass %, 0.01 to 7 mass %, and 0.01 to 3 mass %.

In addition, the electrically conductive adhesive of the present invention preferably further contains a solvent. The type of the solvent is not particularly limited as long as the effect of the present invention is not inhibited. The octanol/water partition coefficient (Log Pow) of the solvent is preferably −2 to 4, more preferably 0.5 to 3.75, and still more preferably 1 to 3.5. As described above, the electrically conductive adhesive of the present invention, in which the silver particle contains the compound represented by the general formula (1) in the protective layer, is excellent in dispersibility of the silver particle into a solvent and can yield a sintered body having a low specific resistance value. Particularly, it is preferable to use such an octanol/water partition coefficient (Log Pow) as the solvent, because dispersibility of the silver particle having the protective layer and the thermosetting resin is particularly improved. Specific examples of the preferred solvent in the present invention include hexyl carbitol (Log Pow: 1.7), texanol (Log Pow: 3.2), isopropyl alcohol (Log Pow: 0.05), α-terpineol (Log Pow: 2.98), diethylene glycol (Log Pow: −1.98), ethylene glycol (Log Pow: −1.36), 2-ethyl-1,3-hexanediol (Log Pow: 1.60), diethylene glycol mono-2-ethylhexyl ether (Log Pow: 2.23), butyl carbitol (Log Pow: 0.56), butyl carbitol acetate (Log Pow: 2.9), and butanediol (Log Pow: −0.34). Particularly preferred solvents are hexyl carbitol (Log Pow: 1.7) and texanol (Log Pow: 3.2). When the electrically conductive adhesive of the present invention further contains a solvent, the solvent contained in the electrically conductive adhesive may be one kind or two or more kinds.

In the electrically conductive adhesive of the present invention, the content ratio of the solvent is not particularly limited as long as the effect of the present invention is exhibited, and is, for example, 2 mass % or more, preferably 3 mass % or more, and more preferably 5 mass % or more, and is, for example, 20 mass % or less, preferably 17 mass % or less, and more preferably 15 mass % or less. As a preferable range, about 2 to 20 mass %, about 2 to 17 mass %, about 2 to 15 mass %, about 3 to 20 mass %, about 3 to 17 mass %, about 3 to 15 mass %, about 5 to 20 mass %, about 5 to 17 mass %, and about 5 to 15 mass %.

Furthermore, the electrically conductive adhesive of the present invention may contain a curing agent (initiator) as another component in addition to the above-described components. The curing agent is not particularly limited as long as it mixes the silver particle and the thermosetting resin to promote curing, and examples thereof include: amine-based ones, such as imidazole-based ones, hydrazide-based ones, boron trifluoride-amine complexes, amine imides, polyamine-based ones, tertiary amines, and alkyl urea-based ones; dicyandiamide-based ones; acid anhydride-based ones; phenol-based ones; and modified products thereof. These can be used alone or as a mixture of two or more thereof.

Among these curing agents (initiators), imidazole-based curing agents are preferably used from the viewpoint of excellent storage stability at low temperatures and rapid curability. As the imidazole-based curing agent, a known imidazole-based curing agent can be used. More specifically, an adduct of an imidazole compound with an epoxy resin is exemplified. Examples of the imidazole compound include imidazole, 2-methylimidazole, 2-ethylimidazole, 2-propylimidazole, 2-dodecylimidazole, 2-phenylimidazole, 2-phenyl-4-methylimidazole, and 4-methylimidazole.

In addition, the content of the curing agent in the electrically conductive adhesive of the present invention is preferably 0.5 mass % or more and 20 mass % or less. This is because: when the content of the curing agent is less than 0.5 mass %, the thermosetting resin may be insufficiently cured to result in the lack of adhesiveness; and when the content of the curing agent is more than 20 mass %, the curing agent may react during storage to deteriorate the stability.

When the silver particle in the present invention is formed into the electrically conductive adhesive, a sintered body obtained by heating the electrically conductive adhesive at 200° C. for 60 minutes has a specific resistance value of preferably 30 μΩ·cm or less, more preferably 20 μΩ·cm or less, and still more preferably 10 μΩ·cm or less. The lower limit of the specific resistance value is, for example, 5 μΩ·cm or more. The method for measuring the specific resistance value of the sintered body is as follows. Specifically, the specific resistance value is measured according to the method described in Examples.

<Specific Resistance Value>

An electrically conductive adhesive is uniformly applied onto a polyimide film so as to be 2 mm×60 mm×coating film thickness of 50 μm, and sintered at a predetermined temperature (200° C.) for 60 minutes to obtain a sintered body. Next, the resistance value of the sintered body is measured with a resistance meter (for example, HIOKI RM3548) under a room temperature condition, and the specific resistance (volume resistance) value is obtained from the actual film thickness value measured with a micrometer. The specific resistance value is the average value of measurements at four points in the sintered body.

2. Method for Manufacturing Electrically Conductive Adhesive

The electrically conductive adhesive of the present invention can be manufactured by mixing the silver particle and the thermosetting resin, and the silver particle and the thermosetting resin are as described above. As described above, the electrically conductive adhesive of the present invention may contain the solvent, and when the solvent is contained, the solvent is mixed.

Next, a method for producing the silver particle having the protective layer containing the compound represented by the general formula (1) is exemplified below.

First, a composition for producing the silver particle (composition for preparing the silver particle) is prepared. Specifically, a silver compound to be a raw material of the silver particle, a compound represented by the general formula (1) to form the protective layer, and if necessary, a compound different from the general formula (1) (such as an amine compound) described above, and a solvent are prepared. From the viewpoint of more suitably exhibiting the effect of the present invention, preferred silver compounds include silver nitrate and silver oxalate, and silver oxalate is particularly preferable. As the solvent, those exemplified as the solvent to be blended in the electrically conductive adhesive described above are preferably exemplified.

In addition, in the process of preparing the electrically conductive adhesive of the present invention, a solvent different from the solvent to be blended in the above-described electrically conductive adhesive may be used and eventually substituted with the solvent to be blended in the electrically conductive adhesive. The different solvent is not particularly limited as long as it can disperse the silver particle, and for example, a polar organic solvent can be used. Examples of the polar organic solvent include: ketones, such as acetone, acetylacetone, and methyl ethyl ketone; ethers, such as diethyl ether, dipropyl ether, dibutyl ether, tetrahydrofuran, and 1,4-dioxane; diols, such as 1,2-propanediol, 1,2-butanediol, 1,3-butanediol, 1,4-butanediol, 2,3-butanediol, 1,2-hexanediol, 1,6-hexanediol, 1,2-pentanediol, 1,5-pentanediol, 2-methyl-2,4-pentanediol, 3-methyl-1,5-pentanediol, 1,2-octanediol, 1,8-octanediol, and 2-ethyl-1,3-hexanediol; glycerol; alcohols, such as a linear or branched alcohol having 1 to 5 carbon atoms, cyclohexanol, 3-methoxy-3-methyl-1-butanol, and 3-methoxy-1-butanol; fatty acid esters, such as ethyl acetate, butyl acetate, ethyl butyrate, ethyl formate, and texanol; glycols or glycol ethers, such as polyethylene glycol, triethylene glycol monomethyl ether, tetraethylene glycol monomethyl ether, ethylene glycol monoethyl ether, diethylene glycol monoethyl ether, diethylene glycol dimethyl ether, triethylene glycol dimethyl ether, tetraethylene glycol dimethyl ether, 3-methoxybutyl acetate, ethylene glycol monobutyl ether, ethylene glycol monobutyl ether acetate, ethylene glycol monohexyl ether, ethylene glycol monooctyl ether, ethylene glycol mono-2-ethylhexyl ether, ethylene glycol monobenzyl ether, diethylene glycol monomethyl ether, diethylene glycol monomethyl ether acetate, diethylene glycol monoethyl ether, diethylene glycol monoethyl ether acetate, diethylene glycol monobutyl ether, diethylene glycol monobutyl ether acetate, diethylene glycol monohexyl ether, diethylene glycol mono-2-ethylhexyl ether, polypropylene glycol, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, tripropylene glycol monomethyl ether, tripropylene glycol monoethyl ether, tripropylene glycol monopropyl ether, and tripropylene glycol monobutyl ether; N,N-dimethylformamide; dimethyl sulfoxide; terpenes, such as terpineol; acetonitrile; γ-butyrolactone; 2-pyrrolidone; N-methylpyrrolidone; N-(2-aminoethyl) piperazine; and the like.

As such a solvent, in addition to the polar organic solvent, a non-polar organic solvent (hydrophobic organic solvent) may be further used. Examples of the non-polar organic solvent include: linear, branched, or cyclic saturated hydrocarbons, such as hexane, heptane, octane, nonane, decane, 2-ethylhexane, and cyclohexane; alcohols, such as linear or branched alcohols having 6 or more carbon atoms; aromatic compounds, such as benzene, toluene, and benzonitrile; halogenated hydrocarbons, such as dichloromethane, chloroform, and dichloroethane; methyl-n-amyl ketone; methyl ethyl ketone oxime; triacetin; and the like. Among them, saturated hydrocarbons and linear or branched alcohols having 6 or more carbon atoms are preferable, and hexane, octane, decane, octanol, decanol, and dodecanol are more preferable. The solvent can be used singly or in combination of two or more kinds thereof.

Each of the components is mixed to obtain the composition for preparing the silver particle. The proportion of each of the components in the composition is appropriately adjusted. For example, the content ratio of silver oxalate in the composition is preferably about 20 to 70 mass % with respect to the total amount of the composition. In addition, the content ratio of the compound represented by the general formula (1) to be deposited onto the surface of the silver particle is preferably about 5 mass % to 55 mass % with respect to the total amount of the composition. When the amine compound is deposited onto the surface of the silver particle, the content ratio of the amine compound is preferably about 5 mass % to 55 mass % with respect to the total amount of the composition. When the fatty acid is deposited onto the surface of the silver particle, the content ratio of the fatty acid is preferably about 0.1 mass % to 20 mass % with respect to the total amount of the composition. When the hydroxy fatty acid different from the compound represented by the general formula (1) is deposited onto the surface of the silver particle, the content ratio of the hydroxy fatty acid is preferably about 0.1 mass % to 15 mass % with respect to the total amount of the composition.

It is also possible to use a composition for preparing a silver particle on which a compound different from the compound represented by the formula (1) (amine compound) or the like is deposited to temporarily synthesize a silver particle on which the amine compound or the like is deposited, followed by substituting the amine compound or the like with the compound represented by the general formula (1) to form the protective layer, according to the method described below.

In addition, the way of mixing each of the components is not particularly limited, and for example, mixing can be performed by a general-purpose device, such as a mechanical stirrer, a magnetic stirrer, a vortex mixer, a planetary mill, a ball mill, a three roll mill, a line mixer, a planetary mixer, or a dissolver. In order to avoid that the heat of dissolution, friction, and the like at the mixing raises the temperature of the composition to start a thermal decomposition reaction of the silver particle, the composition is preferably mixed while keeping the composition at a temperature, for example, 60° C. or lower, particularly 40° C. or lower.

Next, in a reaction vessel, the composition for preparing the silver particle is subjected to a reaction, usually a reaction by heating, to start a thermal decomposition reaction of the silver compound, thereby forming the silver particle. In the reaction, the composition may be introduced into a pre-heated reaction vessel, or the composition may be introduced into a reaction vessel, and then heated.

The reaction temperature may be any temperature at which the thermal decomposition reaction proceeds to form the silver particle, and is, for example, about 50 to 250° C. The reaction time may be appropriately selected according to the desired average particle diameter and the formulation of the composition corresponding thereto. The reaction time is, for example, 1 minute to 100 hours.

Since the silver particle formed by the thermal decomposition reaction is obtained as a mixture containing unreacted raw materials, it is preferable to purify the silver particle. Examples of the purification method include: a solid-liquid separation method; and a precipitation method using the difference in specific gravity between the silver particle and the unreacted raw material such as an organic solvent. Examples of the solid-liquid separation method include a method such as filter filtration, centrifugation, cyclone type, or decanter. In order to facilitate handling during purification, the mixture containing the silver particle may be diluted with a low boiling point solvent, such as acetone and methanol, to adjust the viscosity thereof.

The average particle diameter of the obtained silver particle can be regulated by adjusting the formulation of the composition for producing the silver particle and the reaction conditions.

Method for Substituting and Adjusting Amine Compound or the like on Surface of Silver Particle According to the above method, the temporarily synthesized silver particle (deposited with an amine compound on its surface) is prepared and dispersed into a solvent. Examples of the solvent include the same solvents as exemplified above. Next, the compound represented by the general formula (1) is added in an amount of 0.1 to 5 times the mass of the silver particle, and the mixture is subjected to a step of stirring at room temperature to 80° C. for 1 minute to 24 hours, thereby the amine compound deposited onto the surface of the silver particle can be substituted with the compound represented by the general formula (1). The silver particle on which the amine compound is substituted can be recovered by the above-described solid-liquid separation method or the like.

3. Sintered Body of Electrically Conductive Adhesive

The sintered body of the electrically conductive adhesive of the present invention is obtained by sintering the electrically conductive adhesive of the present invention described in detail above in "1. Electrically Conductive Adhesive". In the sintered body of the electrically conductive adhesive of the present invention, most of the components (such as the compound represented by the general formula (1)) deposited onto the surface of the silver particle and the solvent have been separated due to high heat during the sintering. The sintered body is substantially composed of silver and the thermosetting resin.

The sintering temperature is not particularly limited, and is, for example, 250° C. or lower, preferably about 100° C. to 250° C., more preferably about 150° C. to 250° C. from the viewpoint of enhancing the shear strength and denseness of the obtained sintered body while suitably sintering at a low temperature. From the same viewpoint, the sintering time is preferably about 0.4 hours to 2.0 hours, more preferably about 0.5 hours to 1.2 hours. There is no need to pressurize the electrically conductive adhesive of the present invention at the time of sintering. That is, the electrically conductive adhesive of the present invention can be suitably used for application in which it is used without pressure during sintering. The electrically conductive adhesive of the present invention may be pressurized during sintering. The pressure at the sintering is, for example, about 10 to 30 MPa. The sintering can be performed under an atmosphere such as air and an inert gas (nitrogen gas and argon gas). The way of sintering is not particularly limited, and examples thereof include an oven, a hot air-drying furnace, an infrared drying furnace, laser irradiation, flash lamp irradiation, and a microwave.

The sintered body of the present invention preferably satisfies the specific resistance value shown in the column of "1. Electrically Conductive Adhesive".

4. Electronic Component

The electronic component of the present invention has a part in which members are bonded with each other by the sintered body of the present invention. That is, the electronic component of the present invention is obtained by: disposing the electrically conductive adhesive of the present invention described in detail above in "1. Electrically Conductive Adhesive" between the members of the electronic component (for example, between the members included in a circuit); and sintering the electrically conductive adhesive to adhere the members.

It is possible to lower the specific resistance value of the electronic component of the present invention.

EXAMPLE

The present invention will be described more specifically in the following examples, but the present invention is not limited thereto.

Details of each component used in Examples and Comparative Examples are as follows.

Silver oxalate ($(COOAg)_2$) was synthesized by the method described in Japanese Patent No. 5574761.

Silver particle "b" (manufactured by DOWA ELECTRONICS MATERIALS CO., LTD.; product name AG 2-1C; a silver particle having an average particle diameter of 0.6 μm on which oleic acid is deposited on its surface)

N,N-diethyl-1,3-diaminopropane (manufactured by FUJIFILM Wako Pure Chemical Corporation)

n-hexylamine (Six carbon atoms; manufactured by FUJI-FILM Wako Pure Chemical Corporation)

Ricinoleic acid (manufactured by Tokyo Chemical Industry Co., Ltd.)

2-hydroxyisobutyric acid (manufactured by FUJIFILM Wako Pure Chemical Corporation)

L-lactic acid (manufactured by FUJIFILM Wako Pure Chemical Corporation)

1-butanol (manufactured by FUJIFILM Wako Pure Chemical Corporation)

Methanol (manufactured by FUJIFILM Wako Pure Chemical Corporation)

Hexyl carbitol (manufactured by FUJIFILM Wako Pure Chemical Corporation)

Bisphenol A epoxy resin (manufactured by DIC Corporation; product name EXA-850CRP)

<Synthesis of Silver Particle "a">

Ricinoleic acid (2.34 g), N,N-diethyl-1,3-diaminopropane (203 g), and 1-butanol (375 g) were charged into a 50 mL glass centrifuge tube containing a magnetic stirring bar, and the mixture was stirred for about 1 minute. Then silver oxalate (250 g) was charged, and the mixture was stirred for about 10 minutes to obtain a composition for preparing silver particle "a". Thereafter, these glass centrifuge tubes were erected and installed on a hot stirrer (HHE-19G-U; manufactured by KOIKE PRECISION INSTRUMENTS) equipped with an aluminum block, stirred at 40° C. for 30 minutes, and further stirred at 90° C. for 30 minutes. After cooling, the magnetic stirring bar was taken out, and each composition was added with 15 g of methanol and stirred with a vortex mixer. Then, a centrifugation operation was performed at 3000 rpm (about 1600×G) for 1 minute using a centrifuge (CF7D2; manufactured by Hitachi Koki Co., Ltd.), and the supernatant was removed by inclining the centrifuge tube. The step of adding 15 g of isopropyl alcohol, stirring, centrifugation, and removing the supernatant was repeated 2 times to recover silver particle "a".

Example 1

Using a dispersion of silver particle "a" (isopropyl alcohol) obtained above, 2-hydroxyisobutyric acid was added in an amount of 0.5 times the mass of the silver particle, and the mixture was stirred at room temperature for 2 hours. After stirring, the magnetic stirring bar was taken out, and each composition was added with 15 g of methanol and stirred with a vortex mixer. Then, a centrifugation operation was performed at 3000 rpm (about 1600×G) for 1 minute using a centrifuge (CF7D2; manufactured by Hitachi Koki Co., Ltd.), and the supernatant was removed by inclining the centrifuge tube. Next, the step of adding 15 g of hexyl carbitol, stirring, centrifugation, and removing the supernatant was repeated 2 times to recover the silver particle "a1" (average particle diameter: 100 nm), in which N,N-diethyl-1,3-diaminopropane deposited onto the surface of the silver particle was substituted with 2-hydroxyisobutyric acid.

Next, a hexyl carbitol dispersion of obtained silver particle "a1" and silver particle "b" was mixed with 0.1 g of an epoxy resin (bisphenol A type epoxy resin) to obtain an electrically conductive adhesive. The mixing was performed twice, using MAZERUSTAR manufactured by Kurabo Industries Ltd., in the stirring priority mode. In the electrically conductive adhesive, the content ratio of the silver particle is 84.2 mass % (the mass ratio of silver particle "a1" to silver particle "b" is 1:1), the content ratio of hexyl carbitol is 15.0 mass %, and the content ratio of the epoxy resin is 1.0 mass %.

Example 2

An electrically conductive adhesive was obtained in the same manner as in Example 1 except that a hexyl carbitol dispersion of silver particle "a1" and silver particle "b" was mixed with 0.3 g of an epoxy resin (bisphenol A type epoxy resin) so that, in the electrically conductive adhesive, the content ratio of the silver particle was 82.5 mass % (the mass ratio of silver particle "a1" to silver particle "b" was 1:1), the content ratio of hexyl carbitol was 15.0 mass %, and the content ratio of the epoxy resin was 2.9 mass % in Example 1.

Example 3

An electrically conductive adhesive was obtained in the same manner as in Example 1 except that a hexyl carbitol dispersion of silver particle "a1" and silver particle "b" was mixed with 0.5 g of an epoxy resin (bisphenol A type epoxy resin) so that, in the electrically conductive adhesive, the content ratio of the silver particle was 81.0 mass % (the mass ratio of silver particle "a1" to silver particle "b" was 1:1), the content ratio of hexyl carbitol was 14.9 mass %, and the content ratio of the epoxy resin was 4.8 mass % in Example 1.

Example 4

Using a dispersion of silver particle "a" (isopropyl alcohol) obtained above, L-lactic acid was added in an amount of 0.5 times the mass of the silver particle, and the mixture was stirred at room temperature for 2 hours. After stirring, the magnetic stirring bar was taken out, and each composition was added with 15 g of methanol and stirred with a vortex mixer. Then, a centrifugation operation was performed at 3000 rpm (about 1600×G) for 1 minute using a centrifuge (CF7D2; manufactured by Hitachi Koki Co., Ltd.), and the supernatant was removed by inclining the centrifuge tube. Next, the step of adding 15 g of hexyl carbitol, stirring, centrifugation, and removing the supernatant was repeated 2 times to recover the silver particle "a2" (average particle diameter: 100 nm), in which N,N-diethyl-1,3-diaminopropane deposited onto the surface of the silver particle was substituted with L-lactic acid.

Next, a hexyl carbitol dispersion of obtained silver particle "a2" and silver particle "b" was mixed with 0.1 g of an epoxy resin (bisphenol A type epoxy resin) to obtain an electrically conductive adhesive. The mixing was performed twice, using MAZERUSTAR manufactured by Kurabo Industries Ltd., in the stirring priority mode. In the electrically conductive adhesive, the content ratio of the silver particle is 84.2 mass % (the mass ratio of silver particle "a2" to silver particle "b" is 1:1), the content ratio of hexyl carbitol is 15.0 mass %, and the content ratio of the epoxy resin is 1.0 mass %.

Example 5

An electrically conductive adhesive was obtained in the same manner as in Example 4 except that a hexyl carbitol dispersion of silver particle "a2" and silver particle "b" was mixed with 0.3 g of an epoxy resin (bisphenol A type epoxy resin) so that, in the electrically conductive adhesive, the content ratio of the silver particle was 82.5 mass % (the mass ratio of silver particle "a2" to silver particle "b" was 1:1), the content ratio of hexyl carbitol was 15.0 mass %, and the content ratio of the epoxy resin was 2.9 mass % in Example 4.

Example 6

An electrically conductive adhesive was obtained in the same manner as in Example 4 except that a hexyl carbitol dispersion of silver particle "a2" and silver particle "b" was mixed with 0.5 g of an epoxy resin (bisphenol A type epoxy resin) so that, in the electrically conductive adhesive, the content ratio of the silver particle was 81.0 mass % (the mass ratio of silver particle "a2" to silver particle "b" was 1:1), the content ratio of hexyl carbitol was 14.9 mass %, and the content ratio of the epoxy resin was 4.8 mass % in Example 4.

Comparative Example 1

Using a dispersion of silver particle "a" (isopropyl alcohol) obtained above, n-hexylamine was added in an amount of 0.5 times the mass of the silver particle, and the mixture was stirred at room temperature for 2 hours. After stirring, the magnetic stirring bar was taken out, and each composition was added with 15 g of methanol and stirred with a vortex mixer. Then, a centrifugation operation was performed at 3000 rpm (about 1600×G) for 1 minute using a centrifuge (CF7D2; manufactured by Hitachi Koki Co., Ltd.), and the supernatant was removed by inclining the centrifuge tube. Next, the step of adding 15 g of hexyl carbitol, stirring, centrifugation, and removing the supernatant was repeated 2 times to recover silver particle "a3" (average particle diameter: 100 nm), in which N,N-diethyl-1,3-diaminopropane deposited onto the surface of the silver particle was substituted with n-hexylamine.

Next, a hexyl carbitol dispersion of obtained silver particle "a3" and silver particle "b" was mixed with 0.1 g of an epoxy resin (bisphenol A type epoxy resin) to obtain an electrically conductive adhesive. The mixing was performed twice, using MAZERUSTAR manufactured by Kurabo Industries Ltd., in the stirring priority mode. In the electrically conductive adhesive, the content ratio of the silver particle is 84.2 mass % (the mass ratio of silver particle "a" to silver particle "b" is 1:1), the content ratio of hexyl carbitol is 15.0 mass %, and the content ratio of the epoxy resin is 1.0 mass %.

Comparative Example 2

An electrically conductive adhesive was obtained in the same manner as in Comparative Example 1 except that a hexyl carbitol dispersion of silver particle "a3" and silver particle "b" was mixed with 0.30 g of an epoxy resin (bisphenol A type epoxy resin) so that, in the electrically conductive adhesive, the content ratio of the silver particle was 82.5 mass % (the mass ratio of silver particle "a" to silver particle "b" was 1:1), the content ratio of hexyl carbitol was 15.0 mass %, and the content ratio of the epoxy resin was 2.9 mass % in Comparative Example 1.

Comparative Example 3

An electrically conductive adhesive was obtained in the same manner as in Comparative Example 1 except that a hexyl carbitol dispersion of silver particle "a3" and silver particle "b" was mixed with 0.5 g of an epoxy resin (bisphenol A type epoxy resin) so that, in the electrically conductive adhesive, the content ratio of the silver particle was 81.0 mass % (the mass ratio of silver particle "a" to silver particle "b" was 1:1), the content ratio of hexyl carbitol was 14.9 mass %, and the content ratio of the epoxy resin was 4.8 mass % in Comparative Example 1.

<Production of Sintered Body and Measurement of Specific Resistance Value>

The electrically conductive adhesives were uniformly applied onto a polyimide film so as to be 2 mm×60 mm×coating film thickness of 50 μm, and sintered at a predetermined temperature (200° C. or 250° C.) for 60 minutes to obtain a sintered body. Next, the resistance value of the sintered bodies was measured with a resistance meter (HIOKI RM3548) under a room temperature condition in two-terminal measurement method, and the specific resistance (volume resistance) value was obtained from the actual film thickness value measured with a micrometer. The specific resistance value was the average value of measurements at four points in the sintered body. Table 1 and FIG. 1 show the results of measuring the specific resistance value.

TABLE 1

| | Electrically conductive adhesive | | | Sintered body Specific resistance value (μΩ · cm) |
|---|---|---|---|---|
| | Protective layer of silver particles "a1" to "a3" | Content ratio of epoxy resin (mass %) | Solvent (Log Pow) | |
| Example 1 | "a1": | 1.0 | Hexyl carbitol (1.7) | 3.7 |
| Example 2 | 2-hydroxyisobutyric | 2.9 | | 9.1 |
| Example 3 | acid | 4.8 | | 16.7 |
| Example 4 | "a2": L-lactic acid | 1.0 | | 5.8 |
| Example 5 | | 2.9 | | 12.2 |
| Example 6 | | 4.8 | | 22.5 |
| Comparative Example 1 | "a3": n-hexylamine | 1.0 | | 4.1 |
| Comparative Example 2 | | 2.9 | | 30.7 |
| Comparative Example 3 | | 4.8 | | 116.8 |

<Evaluation of Dispersibility of Silver Particles>

Subsequently, the present inventors evaluated the dispersibility of silver particle "a1", silver particle "a2", and silver particle "a3" obtained as described above in various solvents. Table 2 shows the results.

In the evaluation of dispersibility, each of the silver particles were added to various solvents so as to be 30 mass %, mixed and stirred at room temperature, left to stand, and then the state was visually evaluated. The evaluation criteria are as follows.

Excellent: Completely dispersed

Good: Partially dispersed

Poor: Not dispersed (The silver particle precipitated.)

TABLE 2

| | Log Pow | Silver particle "a1" | Silver particle "a2" | Silver particle "a3" |
|---|---|---|---|---|
| Protective layer | — | 2-Hydroxy-isobutyric acid | L-lactic acid | n-hexylamine |
| Texanol | 3.2 | Good | Poor | Excellent |
| α-terpineol | 2.98 | Excellent | Poor | Excellent |

TABLE 2-continued

| | Log Pow | Silver particle "a1" | Silver particle "a2" | Silver particle "a3" |
|---|---|---|---|---|
| Hexyl carbitol | 1.7 | Excellent | Good | Good |
| Butanediol | −0.34 | Excellent | Excellent | Poor |
| Ethylene glycol | −1.36 | Excellent | Excellent | Poor |
| Diethylene glycol | −1.98 | Excellent | Excellent | Poor |

As shown in Table 2, silver particle "a3", substituted with n-hexylamine, was not dispersed but precipitated in a polar solvent having an octanol/water partition coefficient (Log Pow) of −1.98 to −0.34. On the other hand, silver particle "a1", substituted with 2-hydroxyisobutyric acid, and silver particle "a2", substituted with L-lactic acid, exhibited improved dispersibility. Furthermore, since silver particle "a1" favorably dispersed in a low-polarity solvent having an octanol/water partition coefficient (Log Pow) of 1.7 to 3.2, it was suggested that silver particle "a1" can be employed to various solvents used in the manufacturing of an electrically conductive adhesive.

The invention claimed is:

1. An electrically conductive adhesive comprising:
    a silver particle A having an average particle diameter of 20 to 500 nm;
    a silver particle B having an average particle diameter of 0.5 to 5.5 μm; and
    a thermosetting resin,
    wherein the silver particle A has a protective layer containing a compound represented by the following general formula (1):

[Chemical Formula 1]

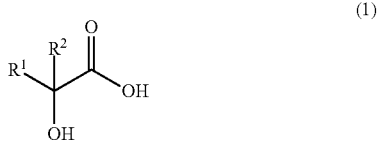

(1)

wherein $R^1$ represents an alkyl group having 1 to 5 carbon atoms; and $R^2$ represents a hydrogen atom or an alkyl group having 1 to 5 carbon atoms, and
    wherein the mass ratio of the silver particle A to the silver particle B is in the range of 30 to 70:70 to 30.

2. The electrically conductive adhesive according to claim 1, further comprising a solvent.

3. The electrically conductive adhesive according to claim 2, wherein the solvent has an octanol/water partition coefficient (Log Pow) of −2 or more and 4 or less.

4. The electrically conductive adhesive according to claim 1, wherein the thermosetting resin is an epoxy resin.

5. The electrically conductive adhesive according to claim 1, wherein the silver particles A and B are contained in a content ratio of 70 mass % or more.

6. A sintered body of the electrically conductive adhesive according to claim 1.

7. An electronic component in which members are bonded with each other by the sintered body according to claim 6.

8. A method for manufacturing a sintered body, the method comprising a step of sintering the electrically conductive adhesive according to claim 1 at a temperature of 100° C. or more and 250° C. or less.

9. A method for manufacturing an electronic component in which members are bonded with each other by a sintered body, the method comprising:
    a step of disposing the electrically conductive adhesive according to claim 1 between the members; and
    a step of sintering the electrically conductive adhesive at a temperature of 100° C. or more and 250° C. or less.

* * * * *